United States Patent [19]
Harrison et al.

[11] Patent Number: 5,732,285
[45] Date of Patent: *Mar. 24, 1998

[54] METHOD AND APPARATUS FOR CONSOLIDATED BUFFER HANDLING FOR COMPUTER DEVICE INPUT/OUTPUT

[75] Inventors: David Frank Harrison, Boulder Creek; Russell T. Williams; Thomas Eugene Saulpaugh, both of San Jose, all of Calif.

[73] Assignee: Apple Computer, Inc., Cupertino, Calif.

[*] Notice: The term of this patent shall not extend beyond the expiration date of Pat. No. 5,615,392.

[21] Appl. No.: 816,412

[22] Filed: Mar. 13, 1997

Related U.S. Application Data

[63] Continuation of Ser. No. 437,125, May 5, 1995, Pat. No. 5,615,392.

[51] Int. Cl.⁶ .................................................. G06F 13/00
[52] U.S. Cl. ........................ 395/876; 395/412; 395/415; 395/479; 395/481; 395/872; 395/828; 395/875; 364/DIG. 1
[58] Field of Search .................................. 395/872, 875, 395/876, 828, 412, 415, 479, 481

[56] References Cited

U.S. PATENT DOCUMENTS

| | | | |
|---|---|---|---|
| 4,407,016 | 9/1983 | Bayliss et al. | 395/823 |
| 4,860,244 | 8/1989 | Bruckert et al. | 395/872 |
| 5,067,075 | 11/1991 | Sugano et al. | 395/872 |
| 5,239,644 | 8/1993 | Seki et al. | 395/872 |
| 5,249,271 | 9/1993 | Hopkinson et al. | 395/872 |
| 5,293,622 | 3/1994 | Nicholson et al. | 395/872 |
| 5,301,351 | 4/1994 | Jippo | 395/872 |
| 5,313,592 | 5/1994 | Buondonno et al. | 395/325 |
| 5,388,246 | 2/1995 | Kasai | 395/872 |
| 5,390,301 | 2/1995 | Scherf | 395/828 |

FOREIGN PATENT DOCUMENTS

| | | | |
|---|---|---|---|
| 0499394 A1 | 8/1992 | European Pat. Off. | G06F 13/38 |
| 0558926 A1 | 9/1993 | European Pat. Off. | G06F 9/46 |
| 0588046 A1 | 3/1994 | European Pat. Off. | G06F 13/38 |
| 0610677 A3 | 8/1994 | European Pat. Off. | G06F 9/46 |
| 4342220 A1 | 6/1994 | Germany | G06F 13/10 |

OTHER PUBLICATIONS

"OS/2 Virtual Device Driver Support for CD-ROM", *IBM Technical Disclosure Bulletin*, vol. 37, No. 10, Oct. 1994, pp. 441–444.

Primary Examiner—Frank J. Asta
Attorney, Agent, or Firm—Fenwick & West LLP

[57] ABSTRACT

A computer has a device driver and an operating system that call a consolidated buffer service routine to coordinate the transfer of data between a main memory and an external device. The consolidated buffer service routine includes a memory preparation service routine and a memory checking service routine. The memory preparation service routine coordinates data transfers between the external device and the memory with the operating system and a data cache, and with other data transfers. The memory preparation service routine ensures that the buffer remains assigned to the memory ranges until the memory checking service routine relinquishes the buffer. Before calling the memory preparation service routine, and I/O preparation table is set which defines the addresses and the type of addresses of the buffer, the size of the data to be transferred, the page size of the buffer, and flags defining data flow and type.

18 Claims, 5 Drawing Sheets

METHOD AND APPARATUS FOR CONSOLIDATED BUFFER HANDLING FOR COMPUTER DEVICE INPUT/OUTPUT

RELATED APPLICATIONS

This is a continuation of application Ser. No. 08/437,125 filed on May 5, 1995 now U.S. Pat. No. 5,615,392.

FIELD OF THE INVENTION

This invention relates to operating system drivers in computer systems, and more particularly, to a driver for preparing memory for data transfers.

BACKGROUND OF THE INVENTION

A typical computer system has a processor that executes an operating system that provides an interface between a user and a mass storage resource, such as a magnetic or optical recording disk. The operating system transfers a user request to retrieve data from a disk drive to a software device driver, also executed by the processor, which provides communication between the operating system and the external device and memory.

Most operating systems, for example Mac OS 7.5 and UNIX, contain a set of services that must be properly combined to achieve the same effect among such services. Designers of different device drivers must coordinate memory protection, residency, addressability, and memory coherency. Memory protection ensures that an input/output (I/O) operation does not violate the access allowed to the memory. Residency ensures that there is not a page fault accessing the memory during the I/O operation.

Addressability ensures that when using direct memory access (DMA) to perform an I/O operation, the logical buffer specification is converted into a physical specification. Memory coherency ensures that the data being moved is not stale and the effects of the data movement are apparent to the processor and any associated data caches.

SUMMARY OF THE INVENTION

The method and apparatus of the present invention control data transfers between a buffer and an external device. Each device driver in the system prepares a buffer by calling a memory preparation service routine, which accepts an I/O preparation table to specify the buffer, prior to data transfers. The I/O preparation table stores a set of parameters indicative of the buffer and of the data that is to be transferred. The set of parameters includes the address of the buffer, the type of addressing, and the size of the data to be transferred. Before the data transfer, the memory preparation service routine acts on the set of parameters by locking the buffer, making the buffer addressable, and manipulating instruction and data caches. After the data transfer, a memory checking service routine manipulates the caches, and selectively deallocates memory resources associated with the preparation of the buffer and unlocks the buffer.

The present invention provides memory protection, residency, addressability, and memory coherency by defining the buffer and its addressing and maintaining its contents until the data transfer is complete.

DETAILED DESCRIPTION

Figure 1:
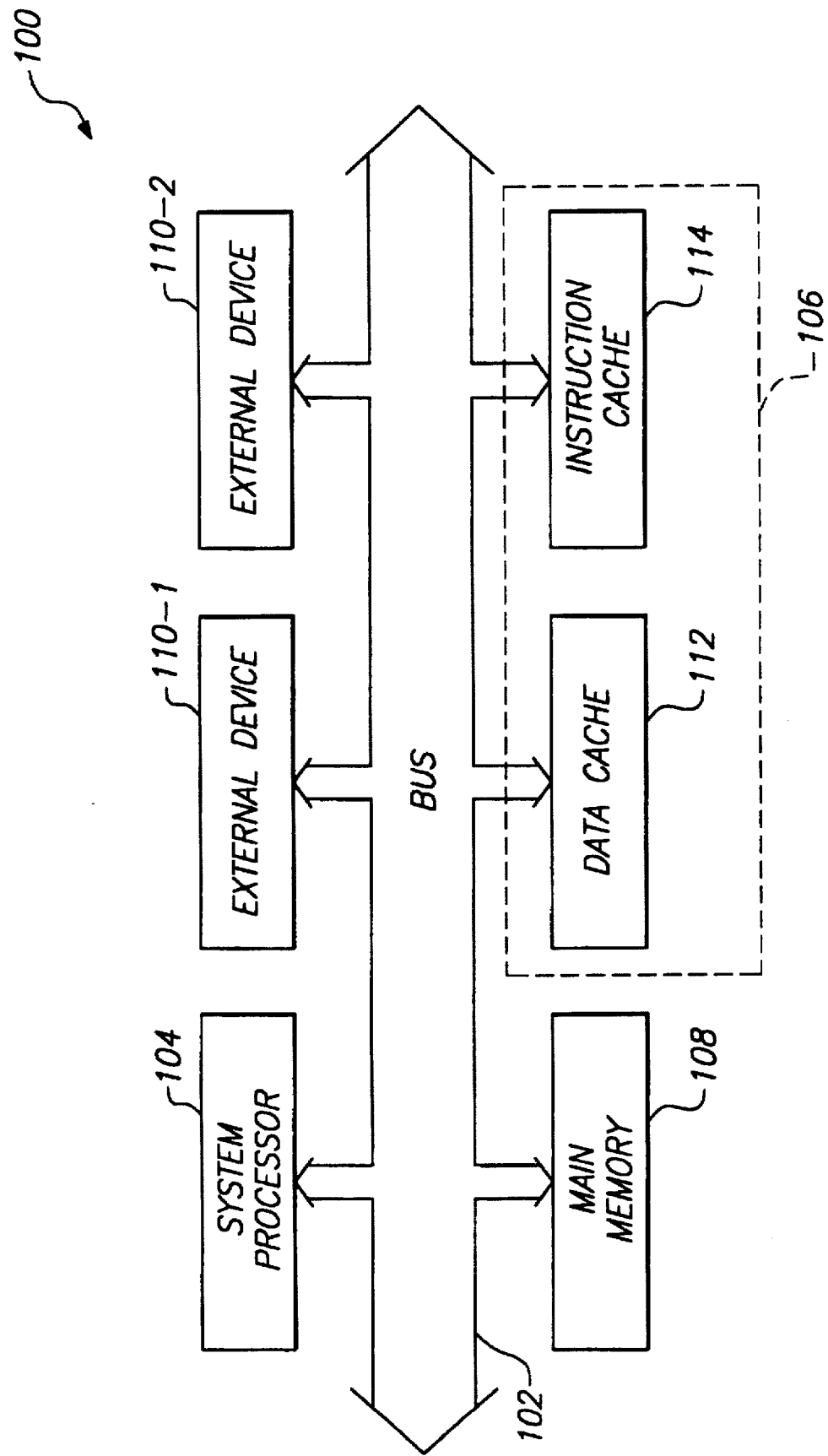
FIG. 1 is a block diagram illustrating a computer in accordance with the present invention.

Referring to FIG. 1, there is shown a computer 100 in accordance with the present invention. The computer 100 has a bus 102 for interconnecting a system processor 104, a cache memory 106, a main memory 108, and a plurality of external devices 110. The hardware of each of these elements is well known in the art. The external device 100 may be, for example, a Small Computer System Interface (SCSI) hard disk drive. The cache memory 106 includes a data cache 112 for storing recently accessed data from the main memory 108 and an instruction cache 114 for storing recently accessed instructions from the main memory 108. For clarity, only two external devices 110-1 and 110-2 are shown.

Figure 2:
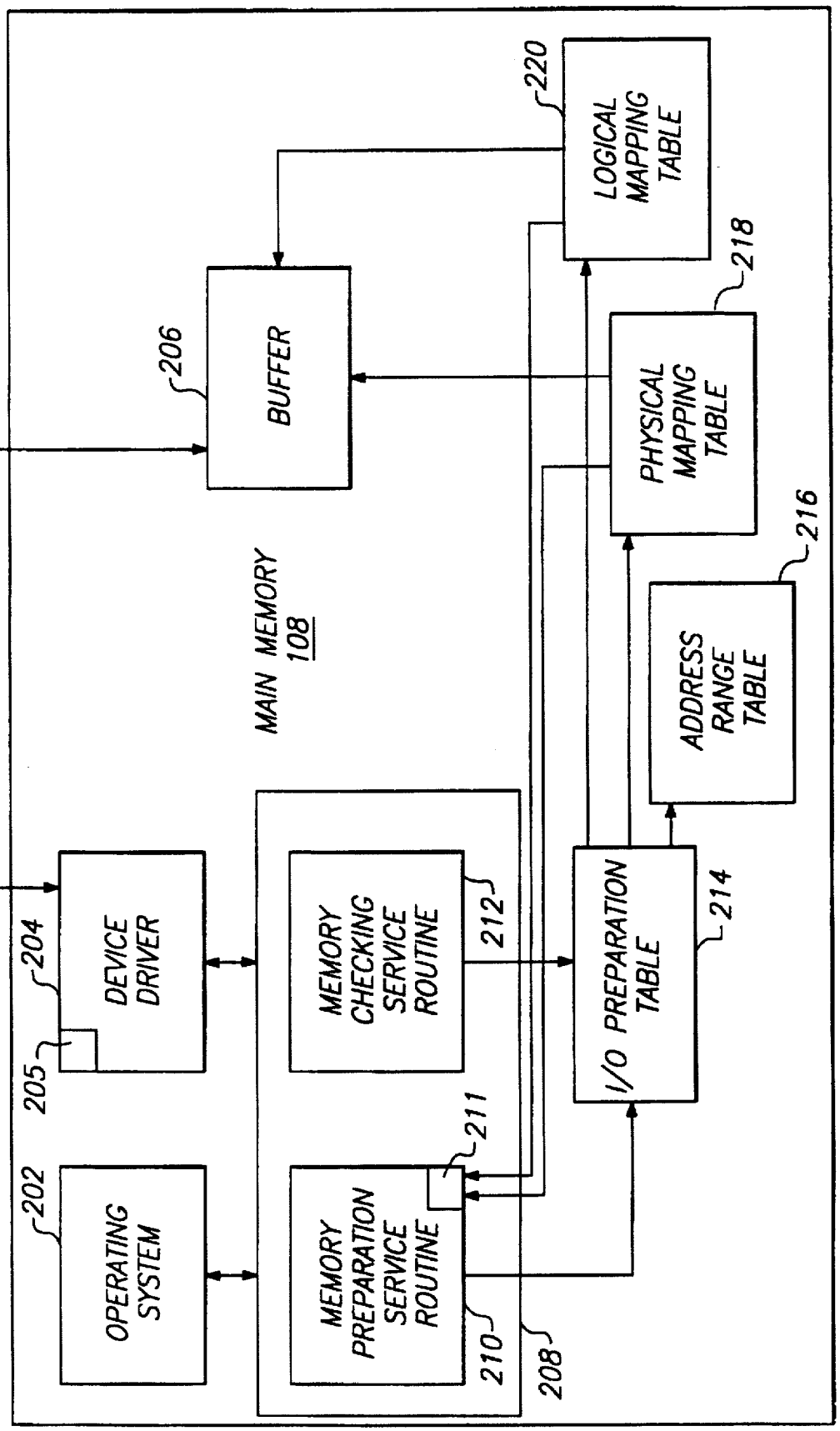
FIG. 2 is a schematic diagram illustrating the main memory of the computer of FIG. 1.

Referring to FIG. 2, there is shown a schematic diagram illustrating the main memory 108. Both an operating system 202 and device drivers 204 are stored in portions of the main memory 108, and are executed by the system processor 104. The operating system 202 receives a user request, converts it into a command and an address and provides the same to the device driver 204. The device driver 204 is a software program that creates an interface to the bus 102. Although the device driver 204 may be integrated with the operating system 202, it is described herein as software separate from the operating system 202 because it operates device-specific functions assigned by the operating system 202. A portion of the memory for the device driver 204 is allocated for at least one private buffer 205.

A buffer 206 is a portion of the main memory 108 at one or more ranges of addresses to or from which data is transferred. The buffer 206 may be arranged, for example, in pages, segments, blocks, or the like. A consolidated buffer service to routine 208 coordinates the transfer of data between the main memory 108 and one or more of the external devices 110. The consolidated buffer service routine 208 includes a memory preparation service routine (PrepareMemoryForIO) 210 and a memory checking service routine (CheckpointIO) 212. The memory preparation service routine 210 coordinates data transfers between external devices 110 and the main memory 108 with the operating system 202 and the data cache 112, and with other data transfers. The memory preparation service routine 210 assigns physical memory to the buffer 206 and ensures that the buffer 206 remains assigned to the memory ranges until the memory checking service routine 212 relinquishes the buffer 206. Depending on the I/O direction and the data path coherence that are specified, and the cache architecture, the memory preparation service routine 210 manipulates the contents of the cache 106 and may make part of the address ranges non-cacheable.

The memory checking service routine 212 performs follow-up operations for an I/O operation of an external device 210. The memory checking service routine 212 prepares for a new operation to the same buffer or reclaims the resources associated with the preparation of the memory.

Each call to the memory preparation service routine 210 preferably is followed by at least one call to the memory checking service routine 212. The device driver 204 preferably calls the memory checking service routine 212 even if the I/O operation is aborted, to deallocate resources used in preparing the ranges of addresses.

The device driver 204 builds or fills the structure of an input/output (I/O) preparation table 214, described later herein in conjunction with FIG. 3, based on the specific request received from the operating system 202. The I/O preparation table 214 specifies the buffer 206 to be prepared and provides storage for the mapping and other information that are returned by the routines 210 and 212. The I/O preparation table 214 is filled and the memory preparation service routine 210 is called before the data movement. For operations with devices having data oriented in blocks, the device driver 204 preferably calls shortly before moving the data. For operations upon buffers, such as memory shared between the system processor 104 and a co-processor (not shown) coupled to the bus 102, frame buffers, or buffers internal to a driver, the device driver 204 preferably fills the I/O preparation table 214 when the buffer 206 is allocated in the memory 10 and calls the memory preparation service routine 210. The latter usage is described later herein in conjunction with FIG. 4.

The device driver 204 may transfer data from buffers that have discontinuous addresses. The caller may specify, using an address range table 216, the buffer 206 to include multiple discontinuous ranges of addresses in the address range table 216 which stores an array of address ranges. The buffer 206 is accordingly specified as a "scatter-gather" buffer. All ranges of addresses in a given address range table 216 are preferably of the same kind, typically either all logical or all physical.

A physical mapping table 218 stores an array of physical addresses. A logical mapping table 220 stores an array of logical addresses. The memory preparation service routine 210 returns the addresses that the device driver 204 may use to access the buffer 206 through the I/O preparation table 214 to the physical mapping table 218 or to the logical mapping table 220 is physical addressing or logical addressing is used, respectively, or to both. The memory preparation service routine 210 has a mapping information table 211 for storing a copy of the physical mapping table 218 or the logical mapping table 220.

Figure 3:
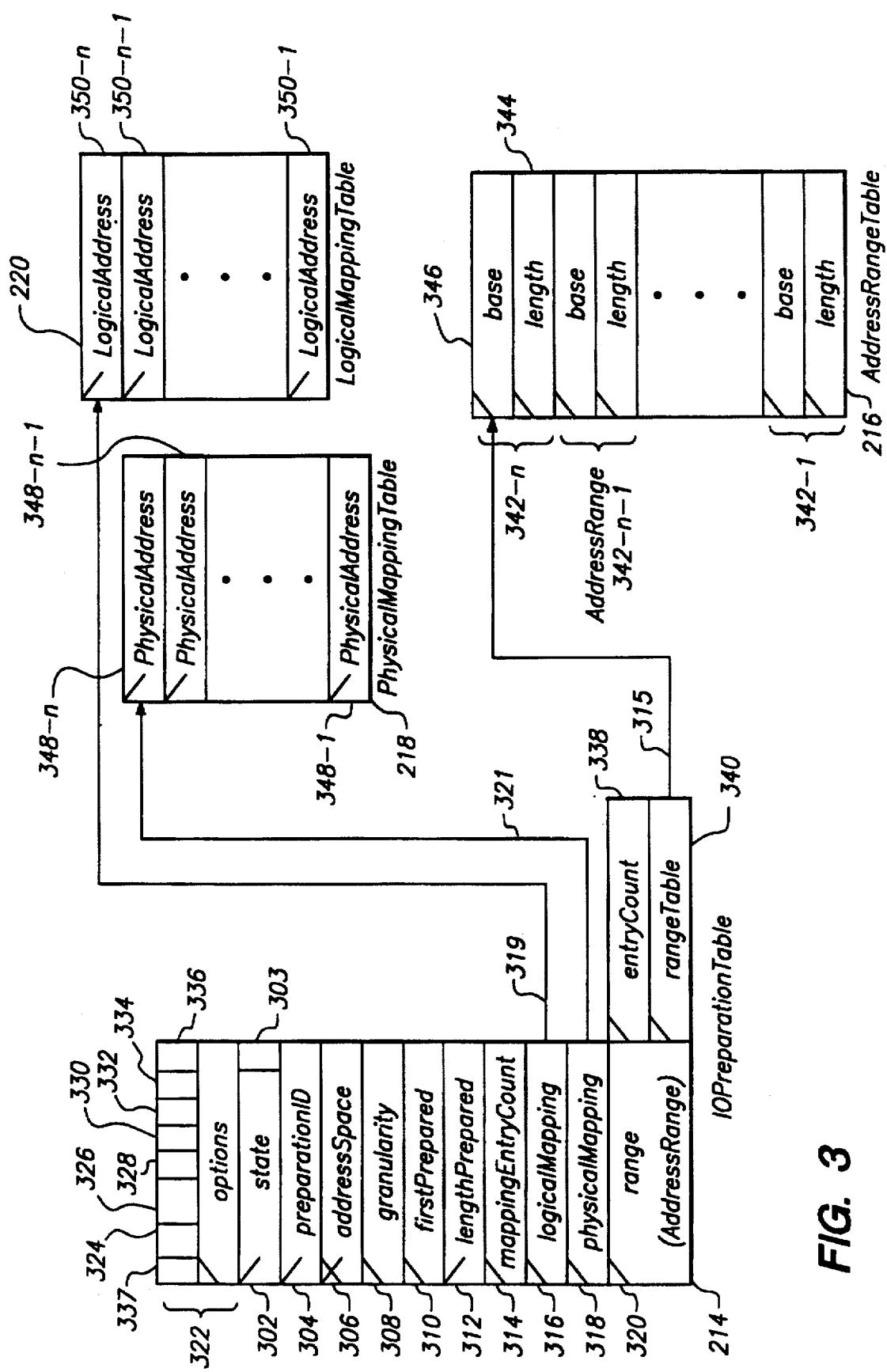
FIG. 3 is a pictorial diagram illustrating an input/output preparation table, an address range table, a physical mapping table, and a logical mapping table of the memory of FIG. 2.

Referring to FIG. 3, there is shown a pictorial diagram illustrating the input/output preparation table 214, the address range table 216, the physical mapping table 218, and the logical mapping table 220. A forward slash (/) in an element in FIG. 3 indicates a field filled by the caller. A back slash (\) in an element indicates a field filled by the memory preparation service routine 210. Both slashes in an element indicates a field filled by both the caller and the memory preparation service routine 210.

The memory preparation service routine 210 has a pointer to the I/O preparation table 214, which is built upon several fundamental types. One example of a structure of the I/O preparation table 214 is defined in Table I, below.

An address space identification (AddressSpaceID) field specifies an existing address space. A logical address (LogicalAddress) field specifies a location in a logical address space.

The logical mapping field 316 includes a pointer to a subsidiary structure. In particular, a logical mapping pointer (LogicalMappingTablePtr) 319 points to the logical mapping table 220. The memory preparation service routine 210 returns in the logical mapping table 220 the static logical addresses that the device driver 204 can use to logically access the buffer 206.

A physical mapping field 318 specifies a location in the physical memory. The physical mapping field 318 includes a pointer to the physical mapping table 218. In particular, a physical mapping pointer (PhysicalMappingTablePtr) 321 points to the physical mapping table 218. The memory preparation service routine 210 returns in the physical mapping table 218 the physical addresses the user may use to physically access the buffer 206.

A byte count (ByteCount) field specifies the number of bytes in a range of addresses. An item count (ItemCount) field specifies the number of elements in an array. An options (OptionBits) field specifies user selected options as bit flags. An address range pointer (AddressRangeTable Ptr) points 315 to the address range table 216.

The memory preparation service routine 210 fills in a state field 302 to indicate the state of the I/O preparation table 214. A state complete (kIOStateDone) flag 303 stored in the state field 302 indicates that the buffer 206 has been prepared up to the end of the specified range of addresses.

The memory preparation service routine 210 fills a preparation identification (preparationID) field 304 to indicate the identifier that represents the I/O transaction.

The device driver 204 specifies, using an address space (addressSpace) field 306, the address space containing the buffer 206 to be prepared.

The device driver 204 specifies information to reduce the memory usage of partial preparations in a granularity field 308. Partial preparations are described later herein in conjunction with FIG. 4. The device driver 204 specifies the byte offset into the buffer 206 at which to begin preparation using a first prepared (firstPrepared) field 310. The memory preparation service routine 210 fills a length prepared (lengthPrepared) field 312 to indicate the number of byte addresses of the buffer 206, beginning at the offset in the firstPrepared field 310, that were successfully prepared.

Figure 4:
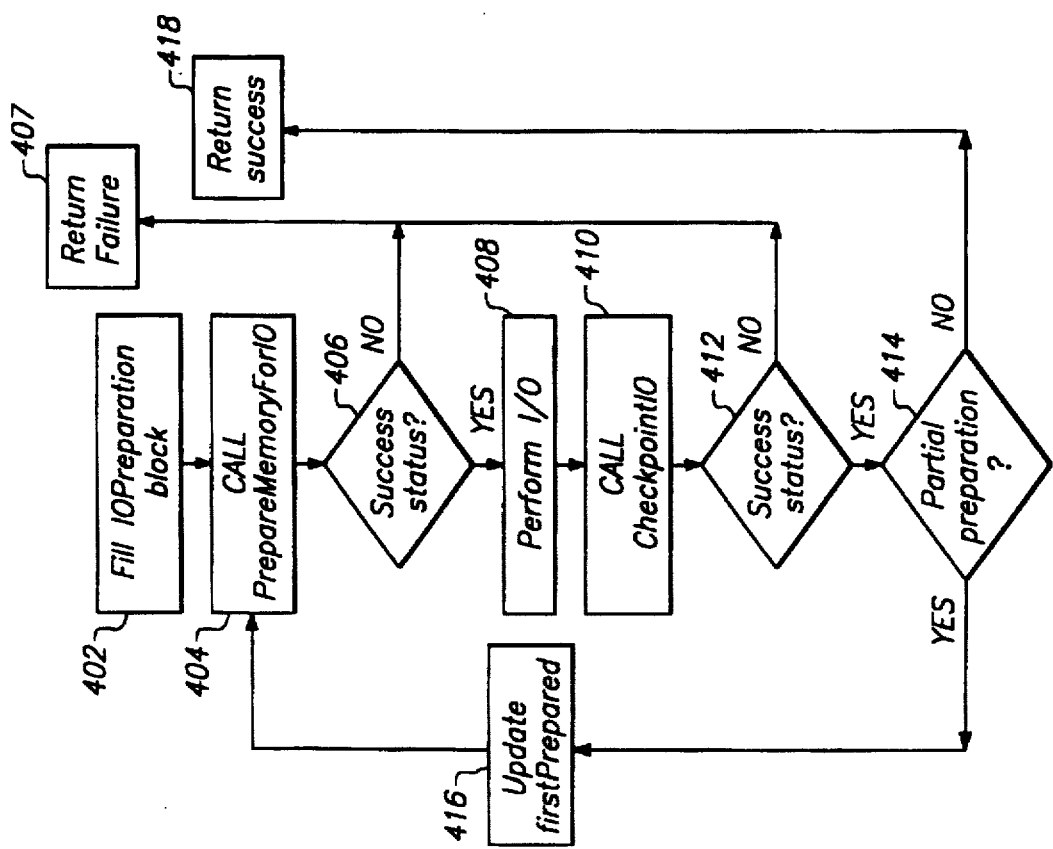
FIG. 4 is a flowchart illustrating the operation of a partial preparation data transfer by the computer of FIG. 1.

The device driver 204 specifies the number of entries in the supplied logical mapping table 220 and the physical mapping table 218 in a mapping entry count (mappingEntryCount) field 314. Normally, the device driver 204 allocates as many entries as there are pages in the buffer 206. The device driver 204 may calculate the number of pages in a memory range from the base address and the length of the range. If there are not enough entries, a partial preparation, described later herein in conjunction with FIG. 4, is performed within the limit of the tables 216, 218, 220.

The device driver 204 specifies the address of an array of logical address (LogicalAddress) values in a logical mapping (logicalMapping) field 316. The memory preparation service routine 210 fills the logical mapping table 220 with the static logical mappings for the specified buffer. The use of the logical mapping table 220 is optional.

The device driver 204 specifies the address of an array of physical address (PhysicalAddress) values in a physical mapping (physicalMapping) field 318. The memory preparation service routine 210 fills the physical mapping table 218 with the physical addresses corresponding to the specific buffer. The use of the physical mapping table 218 is optional.

A range (rangeInfo) field 320 specifies the address of the buffer 206. A simple buffer is represented as a single address range (AddressRange) in the range field 320. A scatter-gather buffer is specified as a multiple address range (MultipleAddressRange) in the range field. If an I/O multiple range flag 324, described later herein, is omitted from the options field 322, the range field 320 is interpreted as an address range. If the I/O multiple range flag 324 is specified in the options, the range field 320 is interpreted as a multiple address range. Because there might be insufficient resources to prepare the entire buffer, the buffer 206 may be prepared in pages or portions thereof, which is described later herein in conjunction with FIG. 4.

The device driver 204 specifies optional characteristics of the I/O preparation table 214 and the transfer process in the options field 322, which includes a plurality of flags.

The I/O multiple range (kIOMultipleRanges) flag 324 specifies that the device driver 204 and the memory preparation service routine 212 is to interpret the range field 320 as a multiple address range to enable the buffer 206 to function as a scatter-gather buffer.

An I/O logical range (kIOLogicalRanges) flag 326 specifies that the base field of the address range is logical addresses. If the I/O logical range flag 326 is not set, the addresses are treated as physical addresses.

A minimal logical mapping (kIOMinimalLogicalMapping) flag 328 specifies that the logical mapping table 220 is to be filled in with only the first and the last mappings of each range, arranged as pairs. The use of the minimal logical mapping flag 328 is described later herein.

A shared mapping table (kIOShareMappingTables) flag 330 specifies that the memory preparation service routine 210 may use the mapping tables 218, 220 of the device driver 204 rather than maintain its own copies of such tables in the mapping information table 211. In a normal mode of operation, the memory preparation service routine 210 maintains the mapping information table 211 as a copy of the mapping tables 218, 220. Memory usage may be reduced if the device driver 204 shares its mapping tables 218, 220 with the operating system 202. If the device driver 204 sets the shared mapping table flag 330, the memory preparation service routine 210 uses the mapping table 218, 220 and does not maintain the mapping information table 211. The mapping tables 218, 220 may be shared if the mapping table is logical memory that can not page-fault (e.g., the memory is locked) and remains as such until the memory checking service routine 212 finally completes and if the mapping table remains allocated and its entries remain unaltered until after the memory checking service routine 212 finally completes. The device driver 204 need not provide both logical and physical mapping tables 218, 220.

An input I/O (kIOIsInput flag) 332 specifies that data will be moved into the main memory 108 from the external device 110. An output I/O (kIOIsOutput) flag 334 specifies that data will be moved out of the main memory 108 to the external device 110.

A coherent data path (kIOCoherentDataPath) flag 336 indicates that the data path that will be used to access memory during the I/O operation is fully coherent with the data caches 112 of the system processor 104, making data cache manipulations unnecessary. In other words, the processor 104 and the data caches 112 detect the effect of data transfers. If the device driver 204 knows that the transfer occurs on a particular hardware path that is coherent, even though the overall hardware architecture is not coherent, it may set the coherent data path flag 336 to indicate a coherent data path.

A client-is-user (kIOClientIsUserMode) flag 337 indicates that the memory preparation service routine 210 is being called on behalf of a non-privileged client. If this option is specified, the memory preparation service routine 210 checks the memory range(s) for user-mode accessibility. If this option is omitted, the memory preparation service routine 210 checks the memory range(s) for privileged-level accessibility.

The physical mapping table 218 has a plurality of physical addresses 348-1 through 343-n. The first physical address 348-1 is the exact mapping of the first prepared address in the range, independent of alignment to a page. The remaining addresses 348-2 through 348-n preferably are aligned to the beginning of a page. If multiple address ranges are specified, the mapping table 218 is a concatenation, in order, of the mappings for each range.

Similarly, the logical mapping table 220 has a plurality of logical addresses 350-1 through 350-n. The first logical address 350-1 is the exact mapping of the first prepared address in the range, independent of alignment to a page. The remaining addresses 350-2 through 350-n preferably are aligned to the beginning of a page. If multiple address ranges are specified, the mapping table 220 is concatenation, in order, of the mappings for each range.

The mapping tables 218, 220 have no explicit length fields. Instead, the entry lengths are implied by the position of the entry in the mapping of the range, the overall range length, and the page size. Generally, the length of the first entry is the length from the first entry to the next page alignment. The length of intermediate entries, if any, is the page size. The length of the last range is the remainder after subtracting the previous lengths from the overall range length. If the prepared range fits within a single page, there is only one prepared entry and its length is equal to the range length.

For a buffer 206 arranged as a scatter-gather buffer, the I/O multiple range flag 324 is specified. The range field 320 specifies a multiple address range (MultipleAddressRange) as an array of address ranges in the address range table 216. In this case, the range field 320 has an entry count (entryCount) field 338 which specifies the number of entries in a range table (rangeTable) field 340, which specifies the address of the address range table 216. The specified ranges may overlap. The address range table 216 stores a plurality of address ranges 342-1 through 342-n. Each address range 342 includes a base address 346 and a length 344 for the address range 342. The options field 322 and the address space field 306 apply equal to each range. The granularity field 308, the first prepared field 310, and the length prepared field 312 apply to the overall addressing of the buffer 206. The use of the fields 308, 310, 312 is described later herein in conjunction with FIG. 4. The resulting mapping table 216 concatenate, in order, the mappings for each range of addresses.

An alignment for direct memory access (DMA) is now described. If the addressing of the buffer 206 does not align to the addressing of an external device 110 for the DMA, the device driver 204 supplies a logical mapping table 220 as well as a physical mapping table 218 to allow programmed I/O to be performed in an unaligned beginning or end of the buffer 206 or both. Otherwise, the device driver 204 must prepare the beginning and the end separately from the middle of the buffer 206. Only the beginning and the end of the buffer 206 is transferred with programmed I/O. Accordingly only the first and the last logical addresses 350-1 and 350-n, respectively, are used. The middle address ranges are aligned to pages, which is sufficient for DMA. To reduce the memory usage, the device driver 204 may limit the size of the logical mapping table 220 to two addresses 350-1 and 350-2 by setting the minimal logical mapping flag 328. The memory preparation service routine 210 fills the first logical address 350-1 as usual and fills the second address 350-2 with the static logical mapping of the last page in the range. Two addresses 350 per range are used, regardless of the range size. For a range of addresses contained within one page, the value of the second address 350-2 is undefined.

The memory preparation service routine 210 and memory checking service routine 212 support multiple concurrent preparations. In this case, the cache actions are appropriate and the individual pages are not pageable until all preparations against those pages have been checked.

One example of a structure of the memory checking service routine 212 is defined in Table II, below. An I/O preparation (theIOPreparation) parameter specifies an I/O preparation identification (IOPreparationID) field made for the I/O operation, as returned by a previous call to the memory preparation service routing 212. When an I/O operation is completed or abandoned, the I/O preparation identification field is used to finish the transaction. An options (theOptions) parameter specifies optional operations, such as a next input I/O (kNextIOIsInput) parameter specifies that data is to be moved into the main memory 108; a next output I/O (kNextIOIsOutput) parameter specifies that data is to be moved out of the main memory 108; and a more I/O transfers (kMoreIOTransfers) parameter specifies that further I/O operations are to occur with the buffer 206. If the more I/O transfers parameter is omitted, the pageability of the buffer 206 is restored and the I/O preparation identification field is invalidated.

For a logical (or programmed) I/O, the device driver 204 sets up the I/O preparation table as shown in Table III, below. For a physical (or direct memory access) I/O, the device driver 204 sets up the I/O preparation table 214 as shown in Table IV, below. The memory preparation service routine 210 selects a physical or logical data transfer if the mapping table is physical or logical, respectively, or selects both.

Referring to FIG. 4, there is shown a flowchart illustrating the operation of a partial preparation data transfer by the computer 100. In the event that insufficient resources are available to prepare all of the specific memory, the memory preparation service routine 210 prepares as much memory as possible, indicates to the device driver 204 the number of byte addresses to the memory that are prepared, clears the table state field 302, and returns a no error status. Examples of resources that may limit the preparation are: physical page frames to make the buffer 206 resident, the size of the mapping tables 216, 218, 220, and the size of the memory taken by the operating system 202. The device driver 204 fills 402 the I/O preparation table 214. The first prepared field, the length prepared field, and the granularity field all control partial preparation data transfers. During the fill 402, the device driver 204 sets the first prepared field 310 to zero. The device driver 204 calls 404 the memory preparation service routine 210. For example, the call may be per the coding described in Tables I through IV, e.g.: OSStatusPrepareMemoryForIO (IOPreparationTable*theIO PreparationTable);

If the resulting table state field 302 does not have the state complete flag 303 set, a partial preparation has been performed. The memory preparation service routine 210 sets the length field 312 to indicate the quantity of data that was successfully prepared.

The granularity field 308 specifies to the memory preparation service routine 210 that the length prepared field 312 is to be an integral multiple of the granularity field 308 rounded up to the next greatest page alignment to thereby prevent preparing more memory than the device driver 204 may use. A value of zero for the granularity field 308 specifies no granularity.

The device driver 204 checks 406 for a success status. If there is not a success status, the device driver 204 returns 407 a failure message. If there is a success status, the device driver 204 performs 408 the requested I/O data transfer against the portion of the buffer 206 that was prepared. The length prepared field 312 indicates the number of addresses of the buffer 206 that were successfully prepared. If the buffer 206 is prepared to its highest address, the state complete flag 303 of the table state field 302 is set.

The device driver 204 calls 410 the memory checking service routine 212. The device driver 204 checks 412 for a success status. If there is not a success status, the device driver 204 returns 407 a failure message. If there is a success status, the device driver 204 determines 414 whether the previous data transfer reached the highest address of the buffer 206 by checking the state complete flag 303 of the table state field 302. If the state complete flag 303 of the table state field 302 is not set, the transfer has s been partially performed and the device driver 204 updates 416 the first prepared field 310 by adding the length prepared field 312 to the previously stored value in the first prepared field 310 and again calls 404 the memory preparation service routine 210. In subsequent calls 404, the memory preparation service routine 210 prepares as much as possible of the remaining address range. If the state complete flag 303 is set, the device driver 204 returns 418 a success message.

Figure 5:
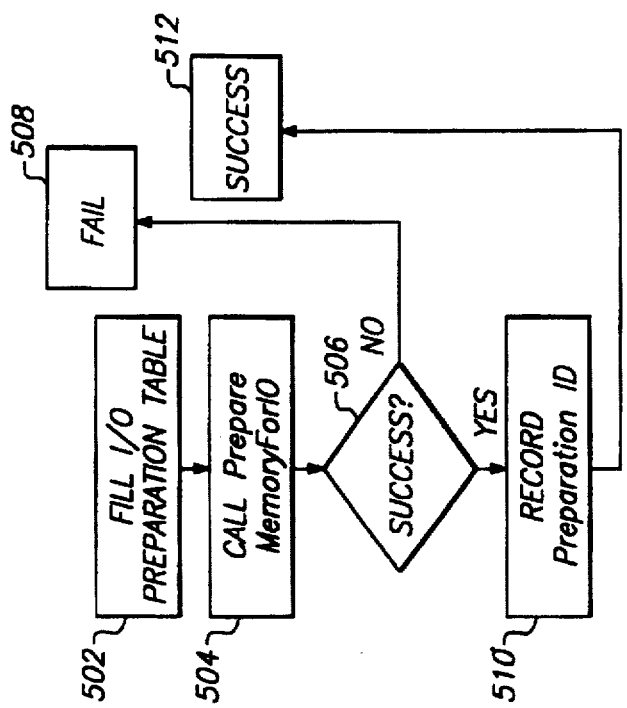
FIG. 5 is a flowchart illustrating the operation of initializing the driver by the computer of FIG. 1 for a series of input/output (I/O) transactions.

Referring to FIG. 5, there is shown a flowchart illustrating the operation of initializing the device driver 204 for a series of input/output (I/O) transactions. The device driver 204 fills 402 the I/O preparation table 214 to indicate that the private buffer 205 is to be prepared. The device driver 204 calls 504 the memory preparation service routine 210. The device driver 204 checks 506 for a success status. If there is not a success status, the device driver 204 returns 508 a failure message. If there is a success status, the device driver 204 records 510 the preparation identification field 304 and returns 512 a success status.

Figure 6:
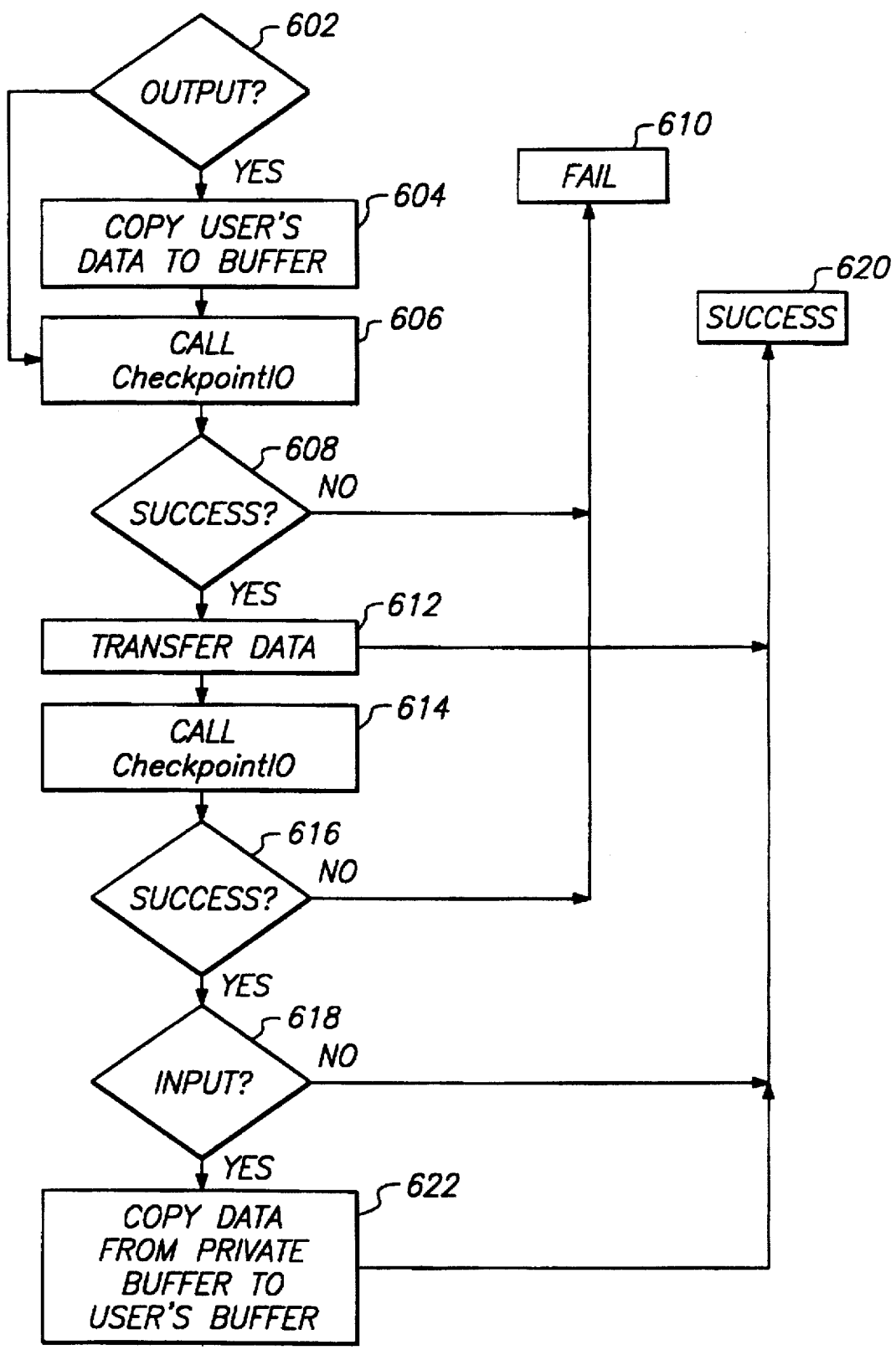
FIG. 6 is a flowchart illustrating the operation of executing I/O transactions by the computer of FIG. 1.

Referring to FIG. 6, there is shown a flowchart illustrating the operation of executing the I/O transaction. The device driver 204 checks 602 if the transaction is an output. If the transaction is an output, the device driver 204 copies 604 the data of the user to the private buffer 205. Otherwise or after the copy 604, the device driver 204 calls 606 the memory checking service routine 212. The device driver 204 checks 608 for a success status. If there is not a success status, the device driver 204 returns 610 a failure message. If there is a success status, the device driver 204 performs 612 the requested data transfer. The device driver 204 calls 614 the memory checking service routine 212 with the more I/O transfers parameter specified. The device driver 204 checks 616 for a success status. If there is not a success status, the device driver 204 returns 610 a failure message. If there is a success status, the device driver 204 checks 618 whether the transaction is an input. If not, the device driver 204 returns 620 a success status. Otherwise, the device driver 204 copies 622 the data from the private buffer 205 to the user's buffer and returns 620 a success status.

In an alternate implementation to that of FIGS. 5–6, the device driver 204 may reduce the execution overhead by postponing manipulations of the cache 112, if the preparation of the memory is done long in advance of the data transfer because the cache manipulations are wasted if the buffer 206 is not accessed shortly before the data transfer. In this case, the device driver 204 omits the input I/O flag 332 and the output I/O flag 334 of the options field 322 to prevent the memory preparation service routine 212 from manipulating the cache 112 at that time. Later, the device driver 204 prepares the cache 112 by calling the memory checking service routine 214 shortly before the data transfer.

In summary, the invention provides an I/O preparation table, a memory preparation service routine, and a memory checking service routine to allow developers of a device driver a standard procedure for data transfers. The I/O preparation table defines the buffer and the data to be transferred. The memory preparation service routine sets up the buffer for the data. The device driver controls the data transfer. After which, the memory checking service routine handles the clean up operation of the buffer for the previous data transfer.

TABLE I

| | |
|---|---|
| typedef unsigned long | AddressSpaceID; |
| typedef void* | LogicalAddress; |
| typedef LogicalAddress | *LogicalMappingTablePtr; |
| typedef void* | PhysicalAddress; |
| typedef PhysicalAddress | *PhysicalMappingTablePtr; |
| typedef unsigned long | ByteCount; |
| typedef unsigned long | ItemCount; |
| typedef unsigned long | OptionBits; |
| typedef struct AddressRange | *AddressRangePtr; |
| structIOPreparationTable | |
| { | |
|    IOPreparationOptions | options; |
|    IOPreparationState | state; |
|    IOPreparationID | preparationID; |
|    AddressSpaceID | addressSpace; |
|    ByteCount | granularity; |
|    ByteCount | firstPrepared; |
|    ByteCount | lengthPrepared; |
|    ItemCount | mappingEntryCount; |
|    LogicalMappingTablePtr | logicalMapping; |
|    PhysicalMappingTablePtr | physicalMapping; |
|    union | |
|    { | |
|      AddressRange | range; |
|      MultipleAddressRange | multipleRanges; |
|    } | rangeInfo; |
| }; | |
| typedef structIOPreparationTable | IOPreparationTable |
| typedef OptionBits | IOPreparationOptions; |
| enum { | |
|    kIOMultipleRanges | = 0x00000001, |
|    kIOLogicalRanges | = 0x00000002, |
|    kIOMinimalLogicalMapping | = 0x00000004, |
|    kIOShareMappingTables | = 0x00000008, |
|    kIOIsInput | = 0x00000010, |
|    kIOIsOutput | = 0x00000020, |
|    kIOCoherentDataPath | = 0x00000040, |
|    kIOClientIsUserMode | = 0x00000080 |
| }; | |
| typedef OptionBits | IOPreparationState; |
| enum { | |
|    kIOStateDone | = 0x00000001; |
| }; | |
| typedef struct MulipleAddressRange; | |
| struct MultipleAddressRange | |
| { | |
|    ItemCount | entryCount; |
|    AddressRangeTablePtr | rangeTable; |
| }; | |

TABLE II

| | |
|---|---|
| typedef OptionBits | IOCheckpointOptions; |
| enum{ | |
|    kNextIOIsInput | = 0x00000001, |
|    kNextIOIsOutput | = 0x00000002, |
|    kMoreIOTransfers | = 0x00000004 |

TABLE II-continued

| | | |
|---|---|---|
| }; | | |
| OSStatus CheckpointIO | (IOPreparationID | theIOPreparation, |
| | IOCheckpointOptions | theOptions); |

TABLE III

| Field | Setting |
|---|---|
| options | kIOLogicalRanges, and either kIOIsInput or kIOIsOutput |
| addressSpace | *CurrentAddressSpaceID |
| granularity | zero |
| firstPrepared | zero |
| mappingEntryCount: | number of pages in buffer |
| logicalMapping | address of table containing mappingEntryCount entries |
| physicalMapping | nil |
| range.base | buffer address |
| range.length | buffer length |

TABLE IV

| Field | Setting |
|---|---|
| options | kIOLogicalRanges, and either kIOIsInput or kIOIsOutput |
| addressSpace | kCurrentAddressSpaceID |
| granularity | zero |
| firstPrepared | zero |
| mappingEntryCount: | number of pages in buffer |
| logicalMapping | nil |
| physicalMapping | address of table containing mappingEntryCount entries |
| range.base | buffer address |
| range.length | buffer length |

We claim:

1. A method for transferring data between a buffer and an external device, the method comprising the steps of:

generating a common set of parameters;

allocating a buffer responsive to the common set of parameters;

providing an address for the buffer in response to the common set of parameters;

locking the buffer to prevent access other than by the external device during the transfer of data;

transferring data between the buffer and the external device responsive to the common set of parameters; and altering a portion of the common set of parameters responsive to the transfer of data.

2. The method of claim 1 further comprising the step of setting in the common set of parameters the size of the data to be transferred, the type of addressing, and the addressing of the buffer.

3. The method of claim 1 wherein the allocating step comprises the step of partially preparing the buffer when available buffer is insufficient to allocate a buffer of the requested size.

4. The method of claim 3 further comprising the step of returning the size of the partially prepared buffer in the common set of parameters.

5. The method of claim 1 further comprising the step of selectively manipulating the contents of a cache memory responsive to the common set of parameters and the transferred data.

6. The method claim 1 further comprising the step of unlocking and selectively deallocating the buffer after the transfer of data to recover buffer accessibility.

7. The method of claim 1 wherein the buffer is in a memory and the allocating step comprises the step of creating in the memory an address range table, comprising base memory addresses and lengths, for allocating the buffer in non-contiguous memory addresses.

8. A computer readable memory storing a computer program for executing a method for transferring data between a buffer and an external device, the method comprising the steps of:

generating a common set of parameters;

allocating a buffer responsive to the common set of parameters;

providing an address for the buffer in response to the common set of parameters;

locking the buffer to prevent access other than by the the external device during the transfer of data;

transferring data between the buffer and the external device responsive to the common set of parameters; and altering a portion of the common set of parameters responsive to the transfer of data.

9. An apparatus for transferring data between a device and a buffer comprising:

an external device;

a buffer coupled to the external device for storing data;

a memory coupled to the external device and to the buffer for storing a common set of parameters;

a device driver for controlling the transfer of data between the external device and the buffer responsive to the common set of parameters;

a memory preparation service routine for allocating the buffer responsive to a common set of parameters, providing an address for the buffer in response to a common set of parameters, and locking the buffer to prevent access other than by the external device during the transfer of data; and a memory checking service routine for modifying the common set of parameters responsive to the transfer of data between the external device and the buffer.

10. The apparatus of claim 9 wherein the memory checking service routine unlocks and selectively deallocates the buffer to recover buffer accessibility.

11. The apparatus of claim 9 wherein the common set of parameters includes the addressing of the buffer, the size of data to be transferred, and the type of addressing.

12. The apparatus of claim 9 wherein the memory checking service routine selectively manipulates the contents of a cache memory responsive to the common set of parameters and the transferred data.

13. The apparatus of claim 9 wherein the memory preparation service routine creates in the memory a logical mapping table for logically addressing the buffer.

14. The apparatus of claim 9 wherein the memory preparation service routine creates in the memory a physical mapping table for physically addressing the buffer.

15. The apparatus of claim 9 wherein the memory preparation service routine partially prepares the buffer when available buffer is insufficient to allocate a buffer of the requested size.

16. The apparatus of claim 15 wherein the memory preparation service routine returns the size of the partially prepared buffer in the common set of parameters.

17. The apparatus of claim 9 wherein the memory preparation service routine creates in the memory an address range table comprising an array of base memory addresses and lengths for allocating the buffer in non-contiguous memory addresses.

18. The apparatus of claim 17 wherein the buffer comprises a scatter-gather buffer.

* * * * *